(12) United States Patent
Motowaki

(10) Patent No.: US 10,717,559 B2
(45) Date of Patent: Jul. 21, 2020

(54) LABEL APPLICATOR WITH LABEL PEELING FUNCTION, ROBOT, AND LABEL PEELING METHOD

(71) Applicant: FANUC CORPORATION, Yamanashi (JP)

(72) Inventor: Yoshio Motowaki, Yamana (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/283,955

(22) Filed: Feb. 25, 2019

(65) Prior Publication Data

US 2019/0300221 A1    Oct. 3, 2019

(30) Foreign Application Priority Data

Mar. 27, 2018 (JP) ................. 2018-060470

(51) Int. Cl.
*B32B 43/00* (2006.01)
*B65C 9/18* (2006.01)
(Continued)

(52) U.S. Cl.
CPC ............ *B65C 9/1884* (2013.01); *B65C 1/021* (2013.01); *B65C 9/30* (2013.01); *B25J 11/008* (2013.01); *B25J 15/0683* (2013.01); *B32B 38/10* (2013.01); *B32B 43/006* (2013.01); *Y10T 156/1132* (2015.01); *Y10T 156/1184* (2015.01); *Y10T 156/1195* (2015.01); *Y10T 156/1944* (2015.01);
(Continued)

(58) Field of Classification Search
CPC . B32B 38/10; B32B 43/006; Y10T 156/1132; Y10T 156/1184; Y10T 156/1195; Y10T 156/1944; Y10T 156/1967; Y10T 156/1994

USPC ................ 156/707, 717, 719, 758, 762, 767
See application file for complete search history.

(56) References Cited

U.S. PATENT DOCUMENTS 5,489,360 A    2/1996   Shimizu et al.
6,311,824 B1 *  11/2001   Van Pul ............... B65G 47/848
                                                    198/370.12
(Continued)

FOREIGN PATENT DOCUMENTS

AU    200072063 A1    6/2001
CA     2327774 A1    6/2001
(Continued)

OTHER PUBLICATIONS

Japanese Office Action dated Feb. 18, 2020, for Japanese Patent Application No. 2018060470.

*Primary Examiner* — Mark A Osele
*Assistant Examiner* — Nickolas R Harm
(74) *Attorney, Agent, or Firm* — Karceski IP Law, PLLC

(57) ABSTRACT

A label applicator with a label peeling function includes a frame supported by a support machine, a suction unit that is supported by the frame and has a suction pad, a claw member having a sharp tip that is disposed under the suction pad, a moving mechanism that is supported by the frame, and supports the claw member so as to be movable in an up-down direction relative to the suction pad, and a lock device that locks movement of the claw member in the up-down direction relative to the suction pad, in a state where the suction pad is placed on top of and in contact with an end of a label lying on the tip of the claw member.

7 Claims, 9 Drawing Sheets

(51) Int. Cl.
*B65C 9/30* (2006.01)
*B65C 1/02* (2006.01)
B25J 11/00 (2006.01)
B25J 15/06 (2006.01)
B32B 38/10 (2006.01)

(52) U.S. Cl.
CPC .... *Y10T 156/1967* (2015.01); *Y10T 156/1994* (2015.01)

(56) References Cited

U.S. PATENT DOCUMENTS

| | | | |
|---|---|---|---|
| 6,520,496 B2 * | 2/2003 | Muller | B65H 5/12 156/568 |
| 9,061,832 B2 * | 6/2015 | Rack | B65G 29/00 |
| 2002/0125630 A1 | 9/2002 | Muller et al. | |
| 2003/0070750 A1 * | 4/2003 | Moore | B65H 20/04 156/249 |
| 2005/0224166 A1 * | 10/2005 | Whelan | B65C 9/1884 156/247 |
| 2013/0133178 A1 * | 5/2013 | Lu | G02F 1/1303 29/592.1 |
| 2015/0251870 A1 * | 9/2015 | Degawa | B65H 37/00 156/249 |
| 2015/0261206 A1 * | 9/2015 | Shiino | B25J 9/1694 700/257 |
| 2015/0319893 A1 * | 11/2015 | Ohno | B32B 43/006 156/702 |

FOREIGN PATENT DOCUMENTS

| | | |
|---|---|---|
| EP | 0646529 A2 | 4/1995 |
| EP | 0721891 A1 | 7/1996 |
| EP | 2915766 A1 | 9/2015 |
| EP | 2926955 A1 | 10/2015 |
| JP | H04018236 A | 1/1992 |
| JP | H05310237 A | 11/1993 |
| JP | H07101428 A | 4/1995 |
| JP | H07291247 A | 11/1995 |
| JP | H08133248 A | 5/1996 |
| JP | 2001206586 A | 7/2001 |
| JP | 2001335014 A | 12/2001 |
| JP | 2011006226 A | 1/2011 |
| JP | 2013014337 A | 1/2013 |
| JP | 2014091618 A | 5/2014 |
| JP | 2015228487 A | 12/2015 |
| WO | 2014083695 A1 | 6/2014 |
| WO | 2015170210 A1 | 11/2015 |

* cited by examiner

LABEL APPLICATOR WITH LABEL PEELING FUNCTION, ROBOT, AND LABEL PEELING METHOD

CROSS-REFERENCE TO RELATED APPLICATIONS

This application is based on and claims priority to Japanese Patent Application No. 2018-060470, filed on Mar. 27, 2018, the entire content of which is incorporated herein by reference in its entirety.

FIELD OF THE INVENTION

The present invention relates to a label applicator with a label peeling function, a robot, and a label peeling method.

BACKGROUND OF THE INVENTION

A label peeling device has been known that includes a tape carrying a plurality of labels at intervals, a peeling member that peels an end of the label from the tape by bending the tape at an acute angle, and a suction pad that sucks up the label peeled at the end by the peeling member (e.g., see Japanese Unexamined Patent Application, Publication No. H 7-101428).

SUMMARY OF THE INVENTION

A label applicator with a label peeling function of a first aspect of the present disclosure includes: a frame supported by a support machine; a suction unit that is supported by the frame and has a suction pad; a claw member having a sharp tip that is disposed under the suction pad; a moving mechanism that is supported by the frame, and supports the claw member so as to be movable in an up-down direction relative to the suction pad; and a lock device that locks movement of the claw member in the up-down direction relative to the suction pad, in a state where the suction pad is placed on top of and in contact with an end of a label lying on the tip of the claw member by means of the moving mechanism.

A label applicator with a label peeling function of a second aspect of the present disclosure includes: a frame; a claw member that is supported by the frame and has a sharp tip; a suction pad disposed above the tip of the claw member; a moving mechanism that is supported by the frame and moves the suction pad in an up-down direction relative to the claw member; and a lock device that locks movement of the suction pad in the up-down direction relative to the claw member in a state where the suction pad is placed on top of and in contact with an end of a label lying on the tip of the claw member by means of the moving mechanism.

A robot of a third aspect of the present disclosure includes an arm, and the label applicator with a label peeling function that is mounted on a distal end of the arm.

A fourth aspect of the present disclosure is a label peeling method of peeling a label from a sheet having the label by using a label applicator with a label peeling function, wherein the label applicator includes: a frame; a suction unit that is supported by the frame and has a suction pad; a claw member having a sharp tip disposed under the suction unit; and a moving mechanism that is supported by the frame and supports the claw member so as to be movable in an up-down direction relative to the suction pad. The label peeling method includes: inserting the tip of the claw member between an end of the label and the sheet so as to lay the end of the label on the tip; moving the frame downward in a state where the claw member is placed on top of and in contact with the sheet, so as to place the suction pad on top of and in contact with the end of the label lying on the tip; locking a movement of the suction pad in the up-down direction relative to the claw member after the aforementioned moving process; peeling the label from the sheet by moving the frame upward after the locking process.

DESCRIPTION OF EMBODIMENTS OF THE INVENTION

A label applicator with a label peeling function 30 and a robot 1 including the label applicator 30 according to a first embodiment of the present invention will be described below using the drawings. In this embodiment, the robot 1 functions as a support machine that supports the label applicator 30.

Figure 1:
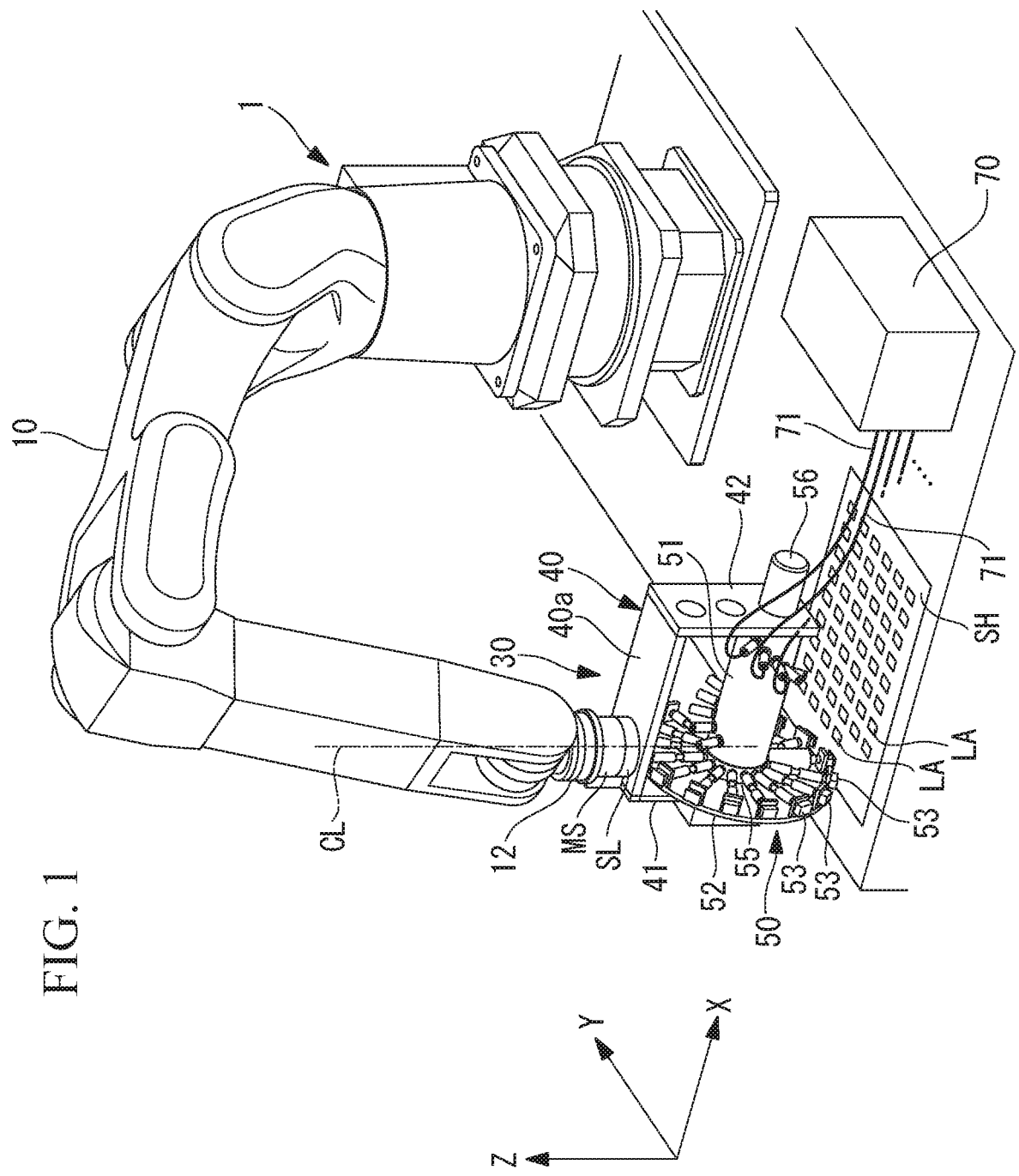
FIG. 1 is a schematic configuration view of a label applicator and a robot of a first embodiment of the present invention.

As shown in FIG. 1, the robot 1 has an arm 10, and the arm 10 includes a plurality of arm members and a plurality of joints. The arm 10 further includes a plurality of servomotors 11 that respectively drives the joints (see FIG. 3).

In this embodiment, an extension direction of a central axis CL of a wrist flange 12 that is an arm member at a distal end of the arm 10 coincides with a Z-axis direction in the following description, and an X-axis and a Y-axis are orthogonal to the Z-axis. In this embodiment, the Z-axis direction coincides with an up-down direction in the following description.

Various types of servomotors, including a rotary motor and a linear motor, can be used as the servomotors 11. Each servomotor 11 has an operating position detection device that detects an operating position and an operating speed of the servomotor 11, and for example, the operating position detection device is an encoder. A detection values of the operating position detection devices are transmitted to a controller 20.

Figure 2:
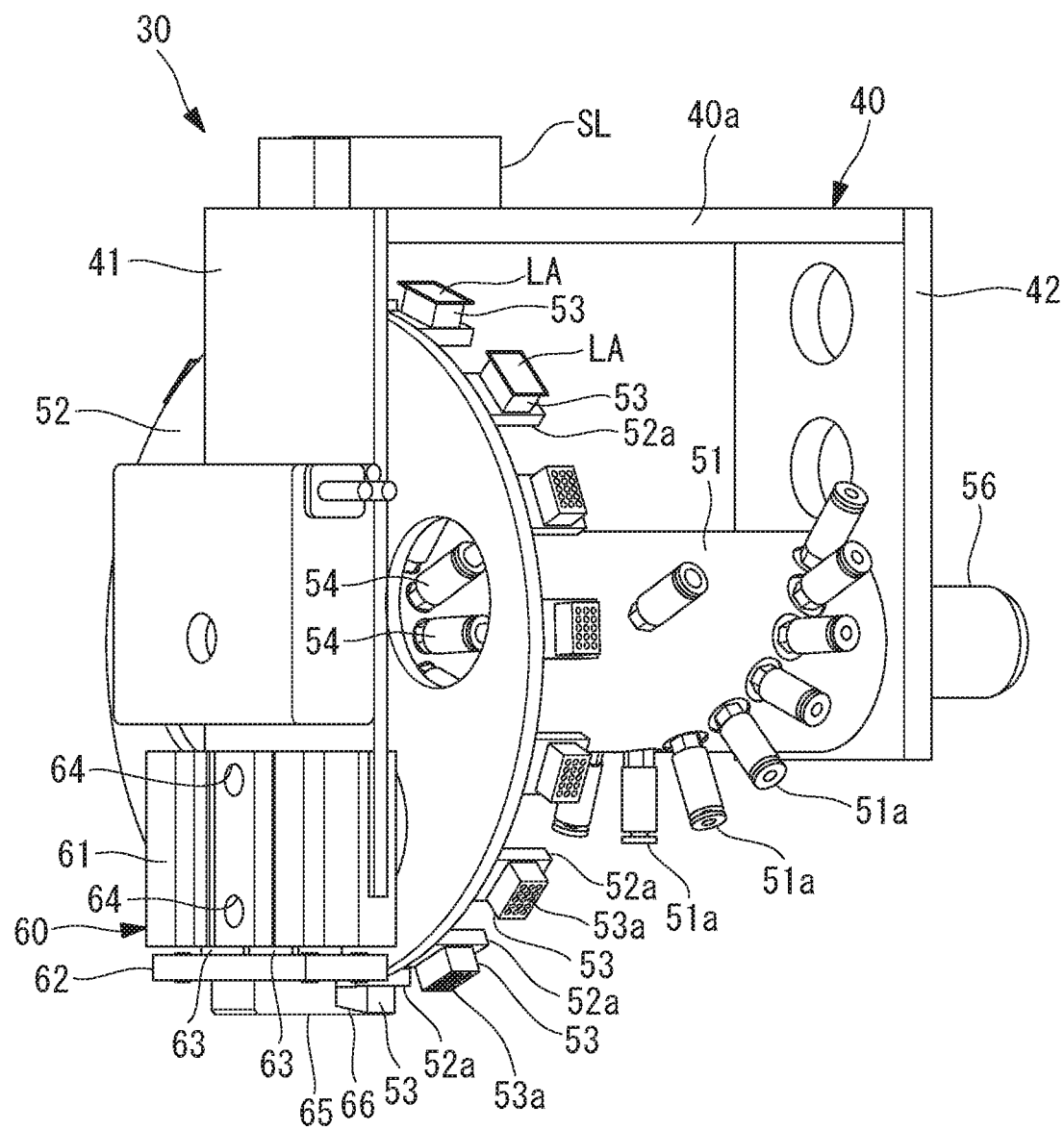
FIG. 2 is a perspective view of the label applicator of the first embodiment.

As shown in FIG. 1 and FIG. 2, the label applicator 30 includes a frame 40, a suction unit 50 supported by the frame 40, a moving mechanism 60 supported by the frame 40, and a claw member 65 supported by the moving mechanism 60.

The frame 40 has a mounting part 40a that is mounted to a distal end of the arm 10, a first part 41 fixed to one end of the mounting part 40a, and a second part 42 fixed to the other end of the mounting part 40a. A slave member SL of a tool changer is fixed to an upper surface of the mounting part 40*a*, and the slave member SL is attached to a master member MS that is fixed to the distal end of the arm 10 (FIG. 1).

The mounting part 40*a* extends in the X-axis direction. An upper end of the first part 41 is fixed to one end of the mounting part 40*a* in the X-axis direction, and the first part 41 extends downward from the mounting part 40*a*. An upper end of the second part 42 is fixed to the other end of the mounting part 40*a* in the X-axis direction, and the second part 42 extends downward from the mounting part 40*a*. In this embodiment, the first part 41 and the second part 42 are plate members, and a thickness direction of the first part 41 and a thickness direction of the second part 42 coincide with the X-axis direction.

One end of a fixed member 51 of the suction unit 50 in the X-axis direction is fixed to one side of the second part 42 in the X-axis direction. This one side is a side facing the first part 41. In this embodiment, the fixed member 51 is a fixed-side member of a rotary joint. For example, MQR16-M5 manufactured by SMC® can be used as the rotary joint. A rotary-side member 55 of the rotary joint is provided at the other end of the fixed member 51 in the X-axis direction, and the rotary-side member 55 is supported by the fixed member 51 so as to be rotatable around a central axis of the fixed member 51.

The rotary-side member 55 is supported by the fixed member 51, for example, through a bearing (not shown), and the central axis of the fixed member 51 extends in the X-axis direction. A disc-shaped rotary body 52 is fixed to the rotary-side member 55. Thus, through the rotary joint, the rotary body 52 is supported by the fixed member 51 so as to be rotatable around the central axis of the fixed member 51.

A plurality of protrusions 52*a* is provided on an outer circumference of the rotary body 52. The protrusions 52*a* protrude from one side of the rotary body 52 in the X-axis direction, and the protrusions 52*a* are arrayed in a circumferential direction of the rotary body 52. A suction pad 53 is fixed to each protrusion 52*a*. The suction pad 53 has a sucking surface 53*a*, and a plurality of suction holes is formed in the sucking surface 53*a*. The suction pad 53 is fixed to a side of the protrusion 52*a* on a radially outer side of the rotary body 52, and the sucking surface 53*a* of the suction pad 53 faces the radially outer side of the rotary body 52.

Tube members 54 respectively corresponding to the suction pads 53 are fixed to the rotary body 52. Each tube member 54 is connected at one end thereof to the suction pad 53 and at the other end thereof to the rotary-side member 55 of the rotary joint.

A plurality of tube connection portions 51*a* is provided on an outer circumferential surface of the fixed member 51, and the tube connection portions 51*a* are spirally arrayed on the outer circumferential surface of the fixed member 51. The tube connection portions 51*a* are respectively connected through the rotary joint to the corresponding tube members 54. Further, the tube connection portions 51*a* are each connected to an air suction device 70 via a tube 71. The air suction device 70 can suction air through each tube connection portion 51*a*. Thus, the air suction device 70 can bring each suction pad 53 into a suctioning state of suctioning a label LA or a non-suctioning state of not suctioning the label LA.

A driving device 56, such as a servomotor, is fixed to the other side of the second part 42 in the X-axis direction, and an output shaft of the driving device 56 is coupled to the rotary-side member 55. Thus, the rotary body 52 is rotated by the driving device 56 relative to the fixed member 51 around the central axis of the fixed member 51. The driving device 56 has an operating position detection device that detects an operating position and an operating speed of the driving device 56, and for example, the operating position detection device is an encoder. Detection values of the operating position detection device are transmitted to the controller 20.

A main body 61 of the moving mechanism 60 is fixed to one side of the first part 41 in the X-axis direction. The moving mechanism 60 has a movable part 62, and the movable part 62 is fixed to one end of a cylinder shaft 63. The other end of the cylinder shaft 63 is disposed inside the main body 61, and the cylinder shaft 63 is supported by the main body 61 so as to be movable in the up-down direction. Thus, the movable part 62 is supported by the main body 61 so as to be movable in the up-down direction.

The moving mechanism 60 in this embodiment is a publicly known air cylinder, and has a first chamber and a second chamber (not shown) provided inside the main body 61. Two air inlet-outlet ports 64 are provided in the main body 61, and the two air inlet-outlet ports 64 are respectively connected to the first chamber and the second chamber.

Figure 8:
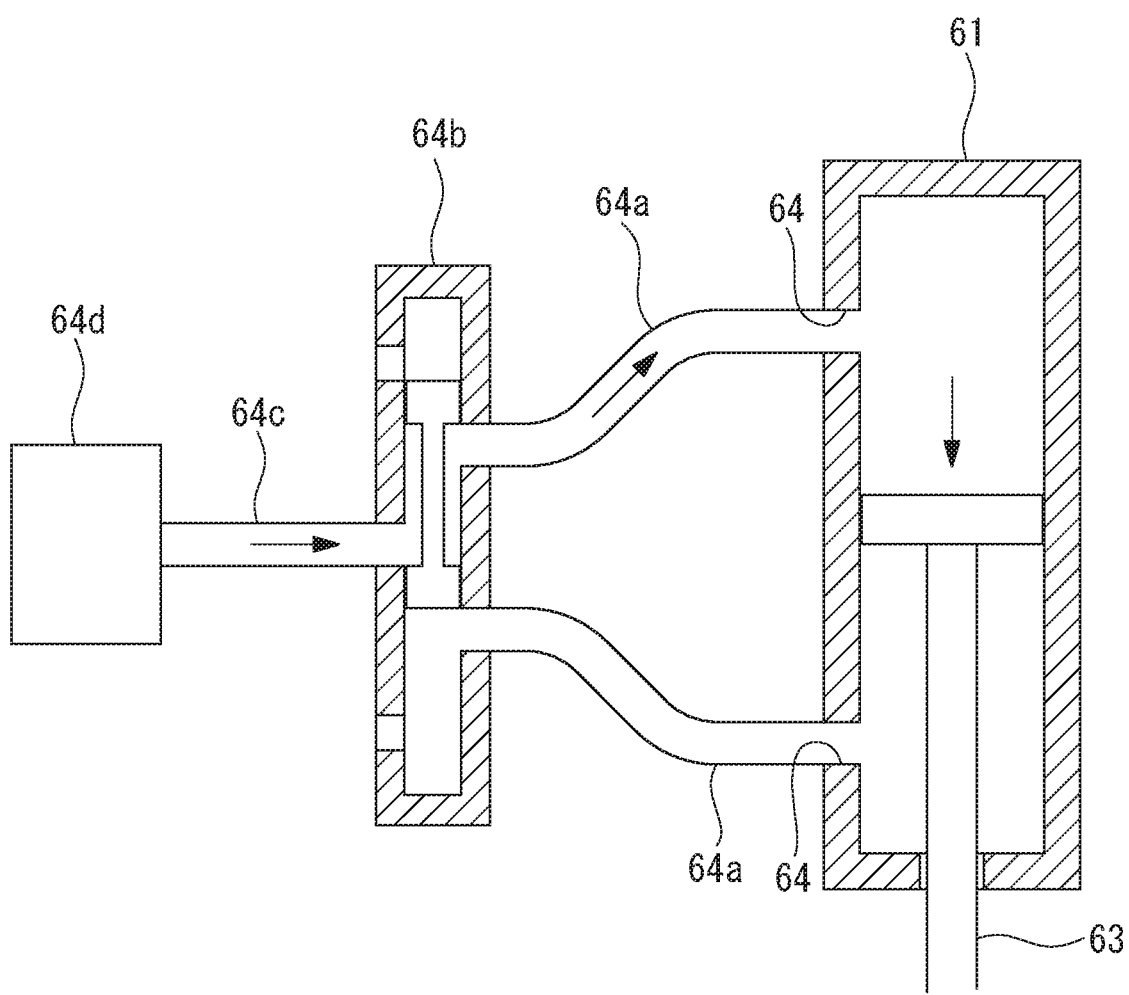
FIG. 8 is a view showing the structure of a moving mechanism of the label applicator of the first embodiment.

As shown in FIG. 8, ends of tubes 64*a* on one side thereof are respectively connected to the two air inlet-outlet ports 64, and ends of the two tubes 64*a* on the other side are connected to a publicly known solenoid valve 64*b*. The solenoid valve 64*b* is connected to an air supply device 64*d*, such as a compressor, via a tube 64*c*.

The solenoid valve 64*b* is controlled by the controller 20, and is thereby brought into a first state in which air from the air supply device 64*d* is supplied only to the first chamber, a second state in which air from the air supply device 64*d* is supplied only to the second chamber, or a third state in which the ends of the two tubes 64*a* on the other side are both closed. In this embodiment, when the solenoid valve 64*b* is controlled into the first state as shown in FIG. 8, air from the air supply device 64*d* is supplied to the first chamber, causing the cylinder shaft 63 and the movable part 62 to move downward.

Figure 5:
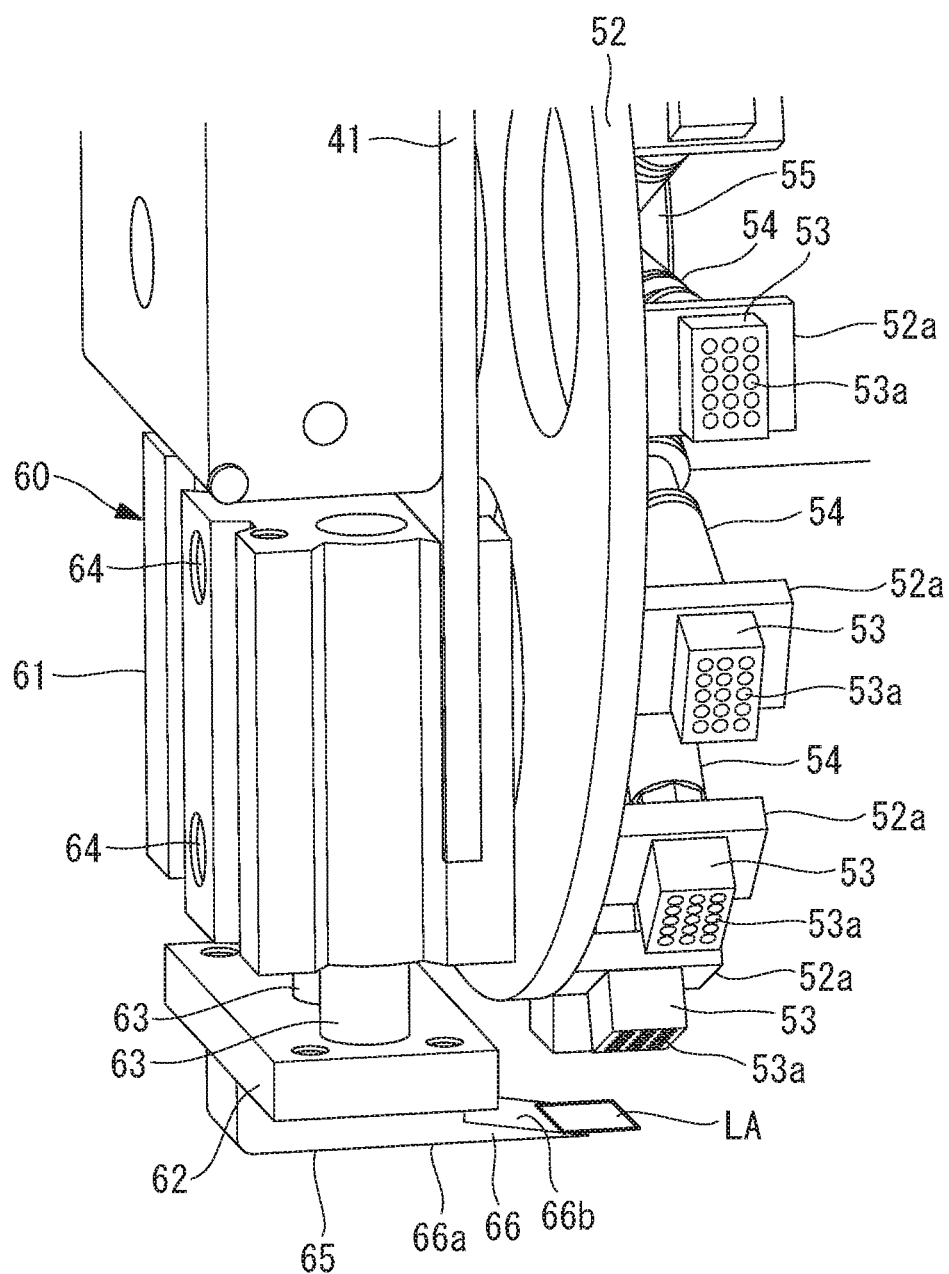
FIG. 5 is a view showing the operation of the robot and the label applicator of the first embodiment.
Figure 6:
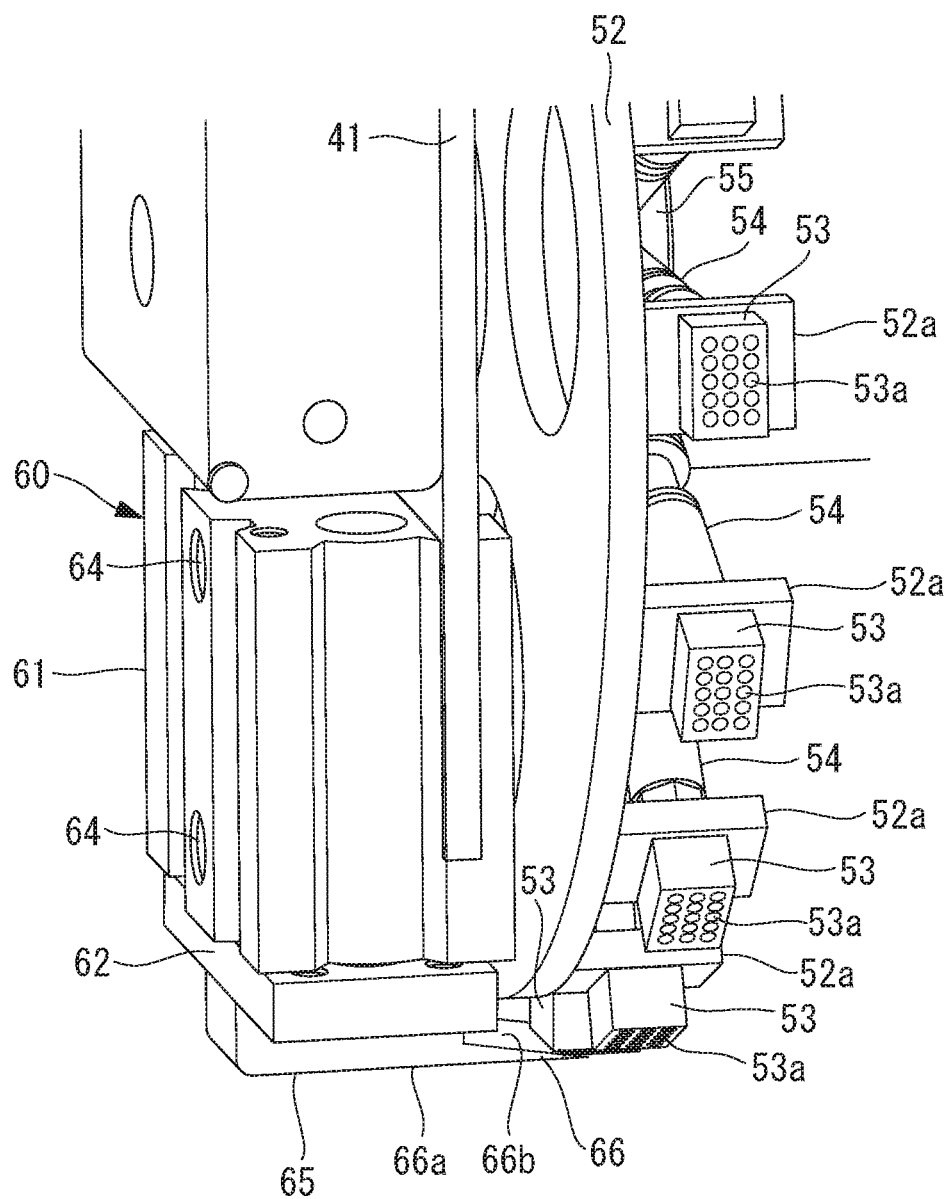
FIG. 6 is a view showing the operation of the robot and the label applicator of the first embodiment.

One end of the claw member 65 in the X-axis direction is fixed to a lower end of the movable part 62, and a sharp tip 66 is formed at the other end of the claw member 65 in the X-axis direction. The tip 66 has a lower surface 66*a* extending in a substantially horizontal direction, and an inclined surface 66*b* inclined downward from the one end toward the other end of the claw member 65 in the X-axis direction (FIG. 5 and FIG. 6). The inclined surface 66*b* and the lower surface 66*a* form an acute angle of, for example, 20° or smaller, and thus the sharp tip 66 is formed at the other end of the claw member 65 in the X-axis direction.

In a state where an arbitrary suction pad 53 is disposed directly under the central axis of the fixed member 51 by the driving device 56, the claw member 65 is disposed directly under this arbitrary suction pad 53.

Figure 3:
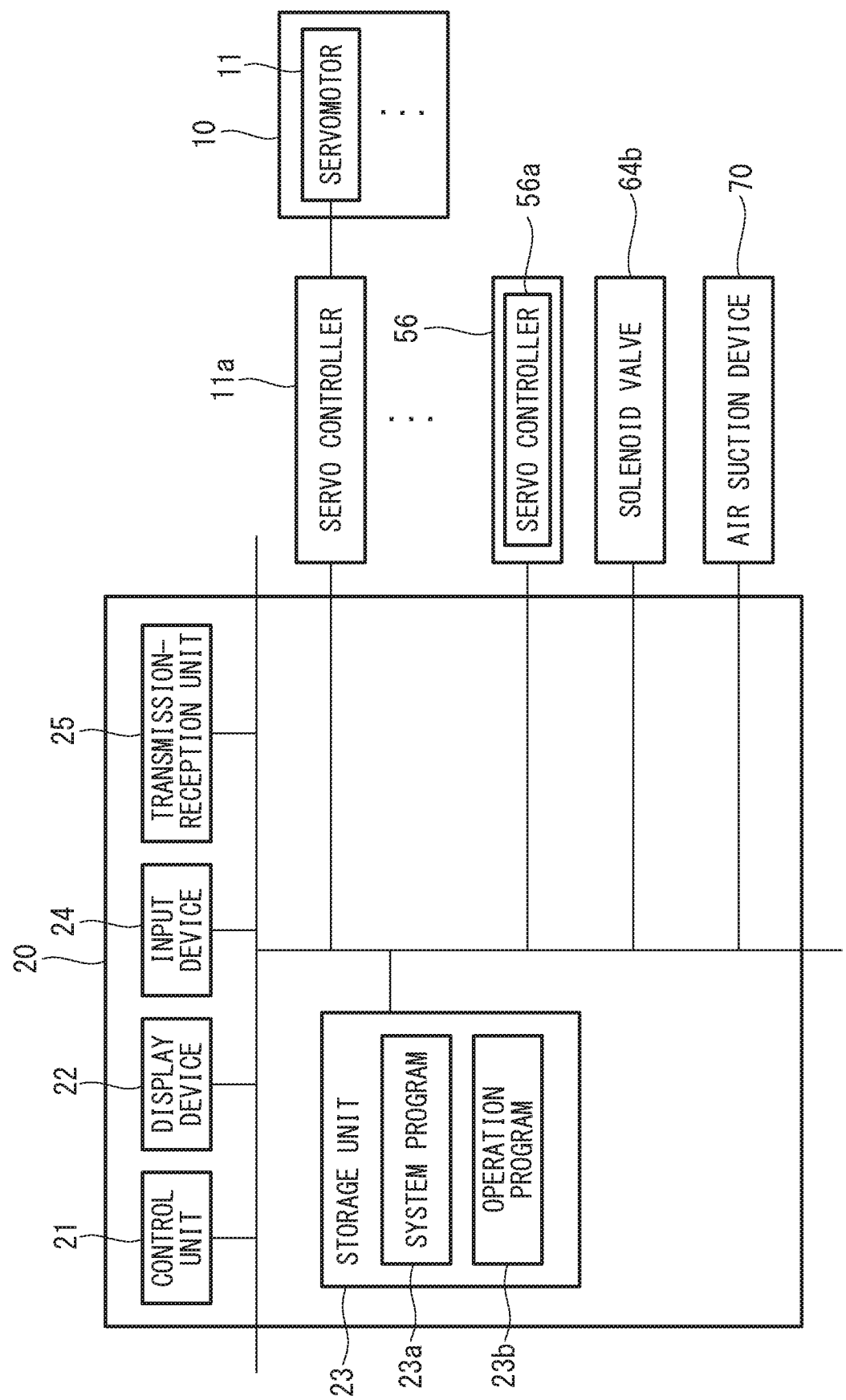
FIG. 3 is a block diagram of a controller of the robot of the first embodiment.

As shown in FIG. 3, the controller 20 includes: a control unit 21 having a processor etc.; a display device 22; a storage unit 23 having a non-volatile storage, an ROM, an RAM, etc.; an input device 24 that is a keyboard, a touch panel, an operator panel, or the like; and a transmission-reception unit 25 that transmits and receives signals. The input device 24 and the transmission-reception unit 25 function as an input unit. The controller 20 controls a servo controller 56*a* of the driving device 56, the solenoid valve 64*b*, the air suction device 70, and the servo controllers 11*a* of the servomotors 11.

A system program 23*a* is stored in the storage unit 23, and the system program 23*a* covers a basic function of the controller 20. An operation program 23*b* is also stored in the storage unit 23. The operation program 23*b* is a group of control commands that causes the arm 10, the driving device 56, the solenoid valve 64*b*, and the air suction device 70 to operate to perform predetermined work using the suction unit 50.

Figure 4:
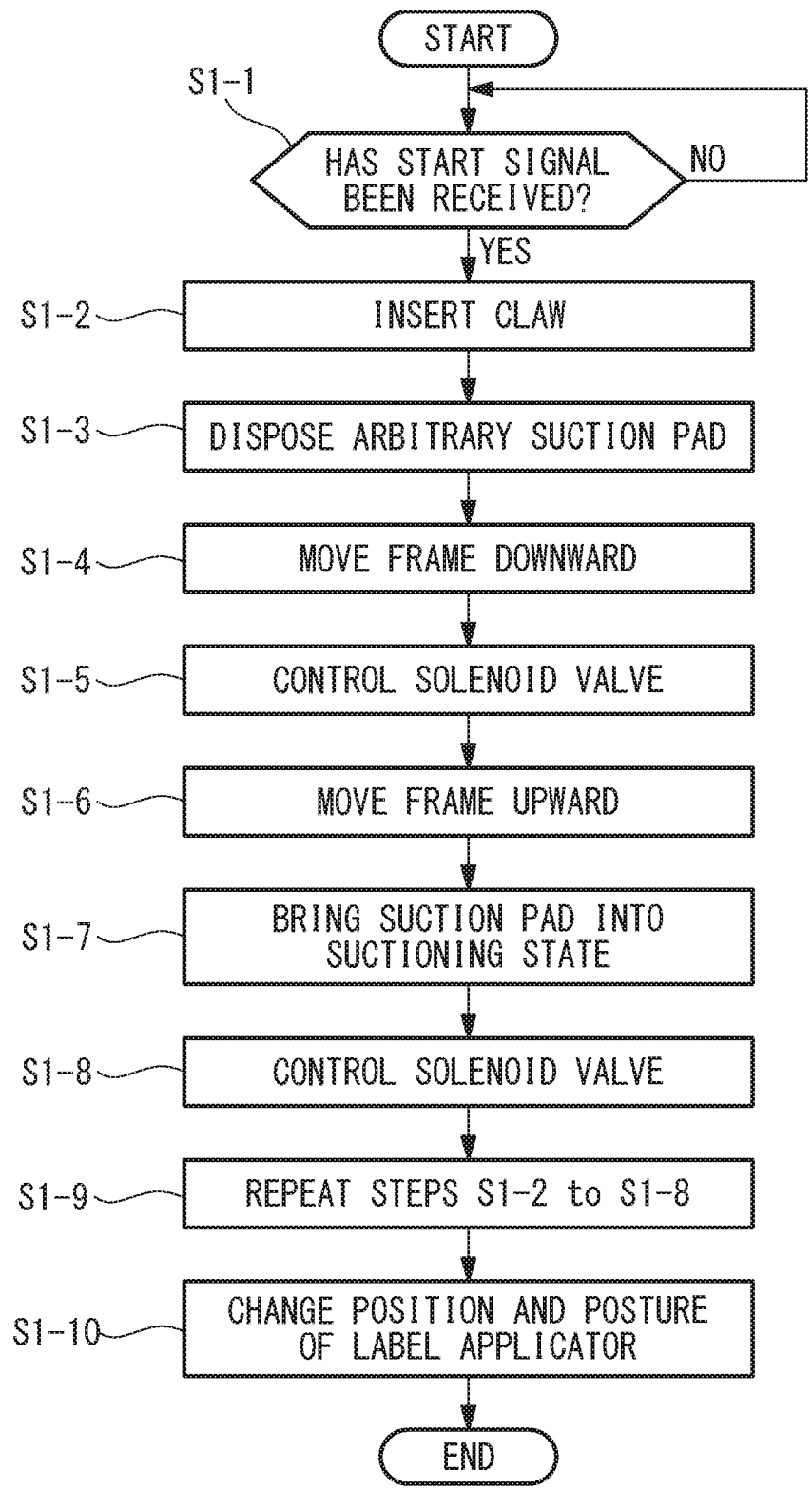
FIG. 4 is a flowchart showing processes performed by the controller of the robot of the first embodiment.

In this embodiment, the control unit 21 performs the following process based on the operation program 23*b*. The following process is shown in the flowchart of FIG. 4.

Before the process to be described below is performed, air from the air supply device 64*d* has been supplied to the first chamber and thereby the cylinder shaft 63 and the movable part 62 have been moved downward.

First, when the control unit 21 receives a start signal that is input through the input device 24, the transmission-reception unit 25, etc. (step S1-1), the control unit 21 transmits control commands to the servo controllers 11*a* (step S1-2). As a result, the arm 10 operates based on the operation program 23*b*, and by the operation of the arm 10, the tip 66 of the claw member 65 is inserted between an end of the label LA and a sheet SH (FIG. 5). For example, the claw member 65 is moved downward by the operation of the arm 10, and then the claw member 65 is moved in the X-axis direction by the operation of the arm 10, so that the tip 66 of the claw member 65 is inserted between the end of the label LA and the sheet SH.

The sheet SH is a sheet carrying a plurality of labels LA. The labels LA and the sheet SH are made of, for example, paper, plastic, aluminum, etc., but other materials can also be used. As shown in FIG. 1, the sheet SH carrying the labels LA is placed on a predetermined flat surface. The sheet SH is attached with a double-sided tape etc., to a predetermined position in the predetermined flat surface.

Next, the control unit 21 transmits a control command to the servo controller 56*a* of the driving device 56, which causes an arbitrary suction pad 53 to be disposed right under the central axis of the fixed member 51 (step S1-3). The arbitrary suction pad 53 is one of the suction pads 53 onto which the label LA has not been sucked up. Step S1-3 is not performed when an arbitrary suction pad 53 has already been disposed right under the central axis of the fixed member 51.

Next, the control unit 21 transmits control commands to the servo controllers 11*a* to move the frame 40 downward (step S1-4). As a result, the arm 10 applies a downward force to the frame 40 and thereby moves the frame 40 toward the predetermined flat surface.

Here, the tip 66 of the claw member 65 has been inserted between the label LA and the sheet SH, and the lower surface of the claw member 65 has been placed on top of and in contact with the sheet SH on the predetermined flat surface. Therefore, when the frame 40 is moved downward by the arm 10, the movable part 62 and the cylinder shaft 63 of the moving mechanism move upward relative to the main body 61. Thus, the air inside the first chamber of the main body 61 moves toward the tube 64*c* via the tube 64*a* and the solenoid valve 64*b*.

As a result of the control in step S1-4, the sucking surface 53*a* of the suction pad 53 is placed on top of and in contact with the end of the label LA lying on the tip 66 of the claw member 65, as shown in FIG. 6. Thus, the end of the label LA is sandwiched between the tip 66 and the sucking surface 53*a*.

Next, the control unit 21 transmits a control command to the solenoid valve 64*b*, and thereby brings the solenoid valve 64*b* into the third state (step S1-5). In the third state, the ends of the two tubes 64*a* on the other sides are both closed as described above. Thus, air stops flowing into and out of both the first chamber and the second chamber of the main body 61 of the moving mechanism 60. As a result, the cylinder shaft 63 and the movable part 62 become unable to move in the up-down direction relative to the main body 61, so that the label LA remains sandwiched between the tip 66 and the sucking surface 53*a*.

Next, the control unit 21 transmits control commands to the servo controllers 11*a* to move the frame 40 upward (step S1-6). As a result, the label LA being held is peeled from the sheet SH. Here, since the end of the label LA is held, the label LA is smoothly peeled from the sheet SH.

Next, the control unit 21 transmits a control command to the air suction device 70 (step S1-7), which causes the air suction device 70 to suction air through the tube 71 corresponding to the suction pad 53 that is holding the peeled label LA. Thus, the suction pad 53 is brought into the suctioning state.

Next, the control unit 21 transmits, to the solenoid valve 64*b*, a control command to bring the solenoid valve 64*b* into the first state to thereby move the claw member 65 downward (step S1-8). Then, based on the operation program 23*b*, the control unit 21 repeats steps S1-2 to S1-8 a predetermined number of times (step S1-9).

Figure 7:
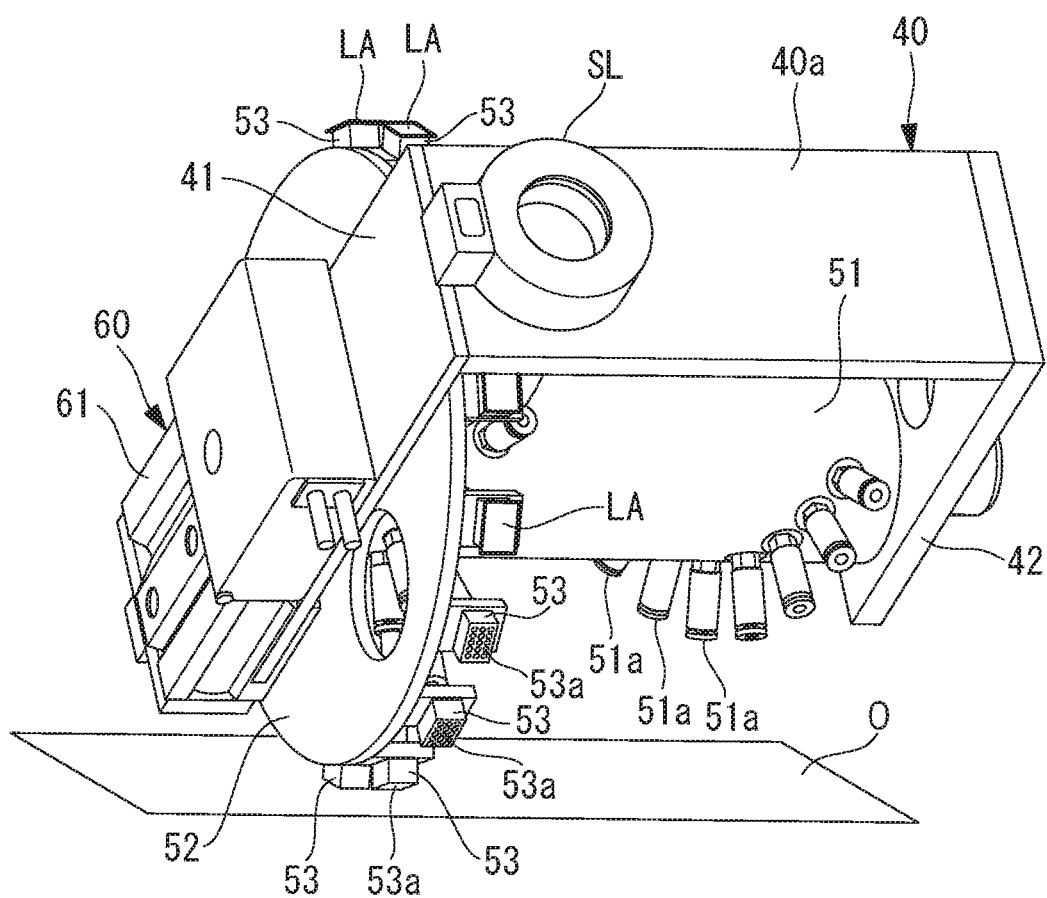
FIG. 7 is a view showing the operation of the robot and the label applicator of the first embodiment.

Next, the control unit 21 changes the position and posture of the label applicator 30 to apply the label LA (step S1-10). That is, the control unit 21 transmits control commands to the servo controllers 11*a*. As a result, for example, as shown in FIG. 7, the label LA on the suction pad 53 disposed in a direction intersecting the Z-axis comes into contact with a labeling target surface O, and the label LA is applied to the labeling target surface O.

As has been described above, in this embodiment, the suction pad 53 and the moving mechanism 60 are supported by the frame 40, and the tip 66 of the claw member 65 is disposed under the suction pad 53. The claw member 65 supported by the moving mechanism 60 is movable in the up-down direction relative to the suction pad 53. Therefore, when the claw member 65 and the suction pad 53 are moved relative to each other by the moving mechanism 60 in a state where the end of the label LA is lying on the tip 66 of the claw member 65, the suction pad 53 is placed on top of and in contact with the end of the label LA lying on the tip 66 of the claw member 65. In this state, the movement of the claw member 65 in the up-down direction relative to the suction pad 53 is locked by the solenoid valve 64*b*. Thus, the solenoid valve 64*b* functions as a lock device.

Thus, the end of the label LA is held between the tip 66 of the claw member 65 and the suction pad 53, and the state where the end of the label LA is held is maintained. Therefore, moving the frame 40 upward can smoothly peel the label LA from the sheet SH carrying the label LA. Moreover, since one of the two members holding the label LA is the suction pad 53, the peeled label LA is reliably sucked up onto the suction pad 53.

As long as the end of the label LA can be laid on the tip 66 of the claw member 65, the sheet SH may be an A4-size sheet and the sheet SH may carry labels LA of different shapes. Thus, restrictions on the labels LA and the sheet SH are eliminated or eased.

In this embodiment, the frame 40 is supported by the robot 1, and the robot 1 moves the frame 40 at least in the up-down direction. When a downward force is applied by the robot 1 to the frame 40 in a state where the claw member 65 is placed on top of and in contact with the sheet SH carrying the label LA, the moving mechanism 60 allows the tip 66 of the claw member 65 and the suction pad 53 to move relative to each other in the up-down direction. Thus, the end of the label LA is held between the tip 66 and the suction pad 53 by the robot 1, which can eliminate the need for providing another driving device to hold the end.

In this embodiment, the suction unit 50 has the rotary body 52 rotatably supported by the frame 40, the driving device 56 that rotates the rotary body 52, and the plurality of suction pads 53 mounted on the rotary body 52. The suction pads 53 are arrayed in the circumferential direction of the rotary body 52, and as the rotary body 52 is rotated by the driving device 56, an arbitrary suction pad 53 of the suction pads 53 is disposed above the tip 66 of the claw member 65.

Thus, the plurality of suction pads 53 is arrayed in the circumferential direction, and an arbitrary suction pad 53 is disposed above the tip 66 of the claw member 65 by the driving device 56, so that the labels LA can be respectively sucked up onto the suction pads 53. This can eliminate the need for the robot 1 to move back and forth multiple times between the sheet SH and the labeling target surface O, for example, even when a plurality of labels LA needs to be applied to the labeling target surface O.

For example, when the labels LA of different shapes need to be applied to the labeling target surface O and these labels LA are carried by the sheet SH, these labels LA are respectively sucked up onto the suction pads 53. Thus, the labels LA of different shapes can be applied without the need for the robot 1 to move back and forth unnecessarily, which is extremely advantageous in increasing the efficiency of label application work.

In this embodiment, the moving mechanism 60 is the air cylinder that moves the claw member 65 in the up-down direction as air flows in and out through the air inlet-outlet ports 64, and the solenoid valve 64b as the lock device stops air from flowing in and out through the air inlet-outlet ports 64.

Thus, simply stopping air from flowing in and out through the air inlet-outlet ports 64 by the solenoid valve 64b can lock the movement of the claw member 65 in the up-down direction relative to the suction pad 53, which allows for simplification of the structure of the label applicator 30.

Alternatively, only one air inlet-outlet port 64 may be provided in the main body 61 of the moving mechanism 60, and this air inlet-outlet port 64 may be connected to the first chamber. Also in this case, stopping air from flowing in and out through the air inlet-outlet port 64 by the solenoid valve 64b can lock the movement of the claw member 65 in the up-down direction relative to the suction pad 53.

Instead of the solenoid valve 64b, a mechanical structure may be used to lock the movement of the claw member 65 in the up-down direction relative to the suction pad 53. For example, a brake device may be provided in the main body 61, and this brake device may hold the cylinder shaft 63 so as to lock the movement of the cylinder shaft 63 in the up-down direction relative to the main body 61. In this case, the brake device functions as the lock device.

Instead of the robot 1, another support machine that supports the label applicator 30 may be used. For example, a support machine having a first cylinder or a first linear-motion mechanism that supports the frame 40 of the label applicator 30 so as to be movable in the up-down direction, and a second cylinder or a second linear-motion mechanism that supports the first cylinder or the first linear-motion mechanism so as to be movable in the X-axis direction, can be used. Also in this case, the label LA can be peeled from the sheet SH in the same manner as described above.

Further, a support machine having a first cylinder or a first linear-motion mechanism that supports the frame 40 of the label applicator 30 so as to be movable in the up-down direction may be used. In this case, an air cylinder is mounted on the movable part 62, and the claw member 65 is fixed to a cylinder shaft of the air cylinder. To insert the tip 66 of the claw member 65 between the end of the label LA and the sheet SH, the claw member 65 is moved by the air cylinder in the X-axis direction. Also in this case, the label LA can be peeled from the sheet SH in the same manner as described above.

It is also possible to provide an electromagnetic valve that can close at least one of the two air inlet-outlet ports 64, without providing the tubes 64a, the solenoid valve 64b, and the air supply device 64d. Also in this case, when the electromagnetic valve is opened, the movable part 62 and the claw member 65 can move downward. An urging member, such as a spring, that moves the movable part 62 and the claw member 65 downward may be provided on the frame 40. On the other hand, when the electromagnetic valve is closed, the movable part 62 and the claw member 65 cannot move in the up-down direction.

A label applicator with a label peeling function 31 and the robot 1 including the label applicator 31 according to a second embodiment of the present invention will be described below using the drawing.

Figure 9:
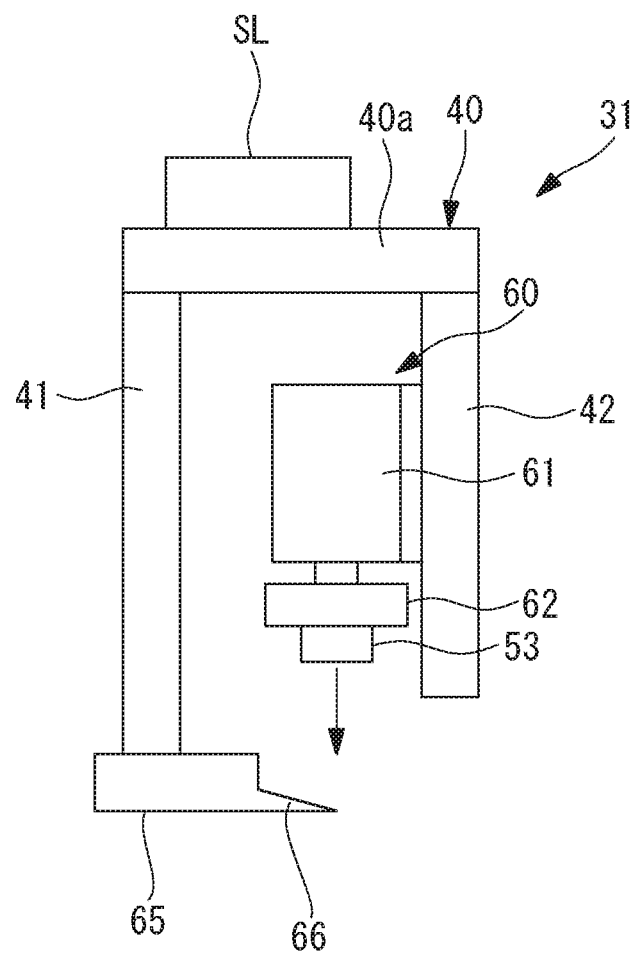
FIG. 9 is a schematic configuration view of a label applicator of a second embodiment.

As shown in FIG. 9, in the second embodiment, the claw member 65 is fixed to a lower end of the first part 41 of the frame 40, while the main body 61 of the moving mechanism 60 is fixed to the second part 42 of the frame 40, and a single suction pad 53 is supported by the movable part 62 of the moving mechanism 60. The tip 66 of the claw member 65 is disposed right under the suction pad 53.

As shown in FIG. 9, the fixed member 51, the rotary body 52, and the driving device 56 of the first embodiment are not provided. Moreover, the tube 71 of the air suction device 70 is directly connected to the suction pad 53. Other components that are similar to or the same as those in the first embodiment will be denoted by the same reference signs and the description thereof will be omitted.

In the second embodiment, first, the solenoid valve 64b is brought into the second state, so that air from the air supply device 64d is supplied to the second chamber, causing the cylinder shaft 63 and the movable part 62 to move upward.

In this state, the frame 40 is moved by the arm 10 of the robot 1, and the tip 66 of the claw member 65 is inserted between the end of the label LA and the sheet SH. Then, the solenoid valve 64b is brought into the first state, so that the movable part 62 and the suction pad 53 are moved downward, and the end of the label LA is held between the suction pad 53 and the tip 66. Also in this case, the solenoid valve 64b functions as a lock mechanism, and the state where the end of the label LA is sandwiched is maintained by the solenoid valve 64b.

When the frame 40 is moved upward by the arm 10 of the robot 1 in the state where the end of the label LA is sandwiched, the label LA is smoothly peeled from the sheet SH. Next, the air suction device 70 suctions air through the tube 71 connected to the suction pad 53. Thus, the suction pad 53 is brought into the suctioning state.

Next, the solenoid valve 64b is brought into the second state, so that air from the air supply device 64d is supplied to the second chamber, causing the cylinder shaft 63 and the movable part 62 to move upward.

Then, the labeling target surface O is disposed under the suction pad 53, and the label LA is applied to the labeling target surface O.

As has been described above, in the second embodiment, the claw member 65 and the moving mechanism 60 are supported by the frame 40, while the suction pad 53 is supported by the moving mechanism 60 so as to be movable in the up-down direction, and the tip 66 of the claw member 65 is disposed under the suction pad 53. Therefore, when the suction pad 53 is moved downward by the moving mechanism 60 in a state where the end of the label LA is lying on the tip 66 of the claw member 65, the suction pad 53 is placed on top of and in contact with the end of the label LA lying on the tip 66 of the claw member 65. In this state, the solenoid valve 64b locks the movement of the suction pad 53 in the up-down direction relative to the claw member 65.

Thus, the end of the label LA is held between the tip 66 of the claw member 65 and the suction pad 53, and the state where the end of the label LA is held is maintained. Therefore, moving the frame 40 upward can smoothly peel the label LA from the sheet SH carrying the label LA. Moreover, since one of the two members holding the label LA is the suction pad 53, the peeled label LA is reliably sucked up onto the suction pad 53.

From the above-described embodiments, the following aspects of the present disclosure are derived.

A label applicator with a label peeling function of a first aspect of the present disclosure includes: a frame supported by a support machine; a suction unit that is supported by the frame and has a suction pad; a claw member having a sharp tip that is disposed under the suction pad; a moving mechanism that is supported by the frame, and supports the claw member so as to be movable in an up-down direction relative to the suction pad; and a lock device that locks movement of the claw member in the up-down direction relative to the suction pad, in a state where the suction pad is placed on top of and in contact with an end of a label lying on the tip of the claw member by means of the moving mechanism.

In this aspect, the suction pad and the moving mechanism are supported by the frame, and the tip of the claw member is disposed under the suction pad. The claw member supported by the moving mechanism is movable in the up-down direction relative to the suction pad. Thus, when the claw member and the suction pad are moved relative to each other by the moving mechanism in a state where the end of the label is lying on the tip of the claw member, the suction pad is placed on top of and in contact with the end of the label lying on the tip of the claw member. In this state, the lock device locks the movement of the claw member in the up-down direction relative to the suction pad.

Thus, the end of the label is held between the tip of the claw member and the suction pad, and the state where the end of the label is held is maintained. Therefore, for example, moving the frame upward can smoothly peel the label from the sheet carrying the label. Moreover, since one of the two members holding the label is the suction pad, the peeled label is reliably sucked up onto the suction pad.

In the above aspect, preferably the support machine may move the frame at least in the up-down direction, and when a downward force is applied to the frame by the support machine in a state where the claw member is placed on top of and in contact with a sheet having the label, the moving mechanism may allow the tip of the claw member and the suction pad to move relative to each other in the up-down direction.

In this case, the end of the label is held between the tip and the suction pad by the support machine such as a robot, which can eliminate the need for providing another driving device to hold the end.

In the above aspect, preferably the suction unit may have a rotary body that is rotatably supported by the frame, a driving device that rotates the rotary body, and a plurality of suction pads mounted on the rotary body. The suction pads may be arrayed in a circumferential direction of the rotary body. As the rotary body is rotated by the driving device, an arbitrary suction pad of the suction pads may be disposed above the tip of the claw member.

In this aspect, a plurality of suction pads is arrayed in the circumferential direction, and an arbitrary suction pad is disposed above the tip of the claw member by the driving device. Thus, labels can be respectively sucked up onto the suction pads. This can eliminate the need for the support machine to move back and forth multiple times between the sheet and a labeling target surface, for example, even when a plurality of labels needs to be applied to the labeling target surface.

For example, when labels of different shapes need to be applied to a labeling target surface and these labels are carried by a sheet, these labels are respectively sucked up onto the suction pads. Thus, labels of different shapes can be applied without the need for the robot to move back and forth unnecessarily, which is extremely advantageous in increasing the efficiency of label application work.

In the above aspect, preferably the moving mechanism may be an air cylinder that moves the claw member in the up-down direction as air flows in and out through an air inlet-outlet port of the air cylinder, and the lock device may stop air from flowing in and out through the air inlet-outlet port.

In this configuration, simply stopping air from flowing in and out through the air inlet-outlet port can lock the movement of the claw member in the up-down direction relative to the suction pad, which allows for simplification of the structure of the label applicator.

A label applicator with a label peeling function of a second aspect of the present disclosure includes: a frame; a claw member that is supported by the frame and has a sharp tip; a suction pad disposed above the tip of the claw member; a moving mechanism that is supported by the frame and moves the suction pad in an up-down direction relative to the claw member; and a lock device that locks movement of the suction pad in the up-down direction relative to the claw member in a state where the suction pad is placed on top of and in contact with an end of a label lying on the tip of the claw member by means of the moving mechanism.

In this aspect, the claw member and the moving mechanism are supported by the frame, while the suction pad is supported by the moving mechanism so as to be movable in the up-down direction, and the tip of the claw member is disposed under the suction pad. Thus, when the suction pad is moved downward by the moving mechanism in a state where the end of the label is lying on the tip of the claw member, the suction pad is placed on top of and in contact with the end of the label lying on the tip of the claw member. In this state, the lock device locks the movement of the suction pad in the up-down direction relative to the claw member.

Thus, the end of the label is held between the tip of the claw member and the suction pad, maintaining the state where the end of the label is held. Therefore, moving the frame upward can smoothly peel the label from the sheet carrying the label. Moreover, since one of the two members holding the label is the suction pad, the peeled label is reliably sucked up onto the suction pad.

A robot of a third aspect of the present disclosure includes an arm, and the label applicator with a label peeling function that is mounted on a distal end of the arm.

A fourth aspect of the present disclosure is a label peeling method of peeling a label from a sheet having the label by using a label applicator with a label peeling function, wherein the label applicator includes: a frame; a suction unit that is supported by the frame and has a suction pad; a claw member having a sharp tip disposed under the suction unit; and a moving mechanism that is supported by the frame and supports the claw member so as to be movable in an up-down direction relative to the suction pad. The label peeling method includes: inserting the tip of the claw member between an end of the label and the sheet so as to lay the end of the label on the tip; moving the frame downward in a state where the claw member is placed on top of and in contact with the sheet, so as to place the suction pad on top of and in contact with the end of the label lying on the tip; locking a movement of the suction pad in the up-down direction relative to the claw member after the aforementioned moving process; peeling the label from the sheet by moving the frame upward after the locking process.

According to the aforementioned aspects, it is possible to reliably suck up a label carried by a sheet onto the suction pad.

The invention claimed is:

1. A label applicator with a label peeling function, comprising:
    a frame supported by a support machine;
    a suction unit that is supported by the frame and has a suction pad;
    a claw member having a tip that is disposed under the suction pad;
    a moving mechanism that is supported by the frame, and supports the claw member so as to be movable in an up-down direction relative to the suction pad; and
    a lock device that locks movement of the claw member in the up-down direction relative to the suction pad in a state where the suction pad is placed on top of and in contact with an end of a label lying on the tip of the claw member by means of the moving mechanism.

2. The label applicator with a label peeling function according to claim 1, wherein
    the support machine moves the frame at least in the up-down direction, and
    when a downward force is applied to the frame by the support machine in a state where the claw member is placed on top of and in contact with a sheet having the label, the moving mechanism allows the tip of the claw member and the suction pad to move relative to each other in the up-down direction.

3. The label applicator with a label peeling function according to claim 1, wherein
    the suction unit has a rotary body that is rotatably supported by the frame, a driving device that rotates the rotary body, and a plurality of suction pads mounted on the rotary body,
    the suction pads are arrayed in a circumferential direction of the rotary body, and
    as the rotary body is rotated by the driving device, an arbitrary suction pad of the suction pads is disposed above the tip of the claw member.

4. The label applicator with a label peeling function according to claim 1, wherein
    the moving mechanism is an air cylinder that moves the claw member in the up-down direction as air flows in and out through an air inlet-outlet port of the air cylinder; and
    the lock device stops air from flowing in and out through the air inlet-outlet port.

5. A robot comprising:
    an arm; and
    the label applicator with a label peeling function according to claim 1 that is mounted on a distal end of the arm.

6. A label applicator with a label peeling function, comprising:
    a frame;
    a claw member that is supported by the frame and has a tip;
    a suction pad disposed above the tip of the claw member;
    a moving mechanism that is supported by the frame and moves the suction pad in an up-down direction relative to the claw member; and
    a lock device that locks movement of the suction pad in the up-down direction relative to the claw member in a state where the suction pad is placed on top of and in contact with an end of a label lying on the tip of the claw member by means of the moving mechanism.

7. A label peeling method of peeling a label from a sheet having the label by using a label applicator with a label peeling function,
    wherein the label applicator includes: a frame; a suction unit that is supported by the frame and has a suction pad; a claw member having a tip disposed under the suction unit; and a moving mechanism that is supported by the frame and supports the claw member so as to be movable in an up-down direction relative to the suction pad,
    the label peeling method comprising:
    inserting the tip of the claw member between an end of the label and the sheet so as to lay the end of the label on the tip;
    moving the frame downward in a state where the claw member is placed on top of and in contact with the sheet, so as to place the suction pad on top of and in contact with the end of the label lying on the tip;
    locking movement of the suction pad in the up-down direction relative to the claw member after the aforementioned moving process; and
    peeling the label from the sheet by moving the frame upward after the locking process.

* * * * *